United States Patent [19]
Heath et al.

[11] Patent Number: 5,964,973
[45] Date of Patent: Oct. 12, 1999

[54] METHOD AND APPARATUS FOR MAKING AN ELASTOMERIC LAMINATE WEB

[75] Inventors: Mark Gordon Heath, Neenah; James Louis Cahall; Timothy Alan French, both of Appleton; Eric Donald Johnson, Larsen; Michael A Snyder, Hortonville, all of Wis.

[73] Assignee: Kimberly-Clark Worldwide, Inc., Neenah, Wis.

[21] Appl. No.: 09/010,456

[22] Filed: Jan. 21, 1998

[51] Int. Cl.⁶ .............................. B32B 31/10; B32B 31/12
[52] U.S. Cl. ........................ 156/161; 156/164; 156/229; 156/250; 242/471; 242/484; 242/530.2; 242/534; 242/535.3; 242/548
[58] Field of Search .................... 156/161, 229, 156/163, 164, 160, 250; 242/548, 471, 530.2, 534, 535.3, 484

[56] References Cited

U.S. PATENT DOCUMENTS

| | | |
|---|---|---|
| H1558 | 7/1996 | Goulait et al. . |
| 3,860,003 | 1/1975 | Buell . |
| 4,031,568 | 6/1977 | Huff . |
| 4,069,822 | 1/1978 | Beull . |
| 4,081,301 | 3/1978 | Buell . |
| 4,147,580 | 4/1979 | Buell . |
| 4,171,107 | 10/1979 | Kayser et al. ................. 242/548 X |
| 4,261,782 | 4/1981 | Teed . |
| 4,300,967 | 11/1981 | Sigl . |
| 4,343,440 | 8/1982 | Engl ............................... 242/548 X |
| 4,486,192 | 12/1984 | Sigl . |
| 4,552,795 | 11/1985 | Hansen et al. . |
| 4,640,859 | 2/1987 | Hansen et al. . |
| 4,645,135 | 2/1987 | Morris et al. . |
| 4,657,539 | 4/1987 | Hasse . |
| 4,842,666 | 6/1989 | Werenicz . |
| 4,891,249 | 1/1990 | McIntyre ....................... 156/301 X |
| 4,900,317 | 2/1990 | Buell . |
| 4,949,668 | 8/1990 | Heindel et al. . |
| 4,995,333 | 2/1991 | Keller et al. . |
| 5,021,051 | 6/1991 | Hiuke . |
| 5,024,667 | 6/1991 | Malcolm et al. . |
| 5,026,364 | 6/1991 | Robertson . |
| 5,057,571 | 10/1991 | Malcolm et al. . |
| 5,124,111 | 6/1992 | Keller et al. . |
| 5,316,836 | 5/1994 | Heindel et al. . |
| 5,342,647 | 8/1994 | Heindel et al. . |
| 5,413,849 | 5/1995 | Austin et al. . |
| 5,431,343 | 7/1995 | Kubiak et al. . |
| 5,501,756 | 3/1996 | Rollins et al. . |
| 5,567,260 | 10/1996 | McFall . |
| 5,850,982 | 12/1998 | Roth et al. ..................... 242/548 X |

FOREIGN PATENT DOCUMENTS 9216366  10/1992  WIPO .

OTHER PUBLICATIONS

TAPPI Official Test Method T 541 om–89, "Internal Bond Strength of Paperboard (Z–Direction Tensile)," published by the TAPPI Press, Atlanta, Georgia, corrected 1991, pp. 1–2.

*Primary Examiner*—Jeff H. Aftergut
*Attorney, Agent, or Firm*—Paul Yee

[57] ABSTRACT

The present invention provides a process for making an elastomeric web. Generally stated, the process includes moving a first web (26) along an appointed machine-direction (28) of the process, and delivering a plurality of elastomeric strands (30) moving along the machine-direction. The elastomeric strands (30) have been elastomerically stretch to an elongation of at least about 50 percent, and the plurality of elastomeric strands (30) have been laterally distributed along an appointed cross-direction (32) of the process. The elastomeric strands (30) are positioned at a spaced distance (34) from the first web (26), and an adhesive is applied to the elastomeric strands (30) and the first web (26) while the elastomeric strands are at the spaced distance (34) from the first web (26). A second web (36) is laminated to the first web (26) with the elastomeric strands (30) sandwiched between the first and second webs to provide an elastomeric laminate, composite web (24) attached together with the adhesive. The composite web (24) is allowed to elastomerically contract lengthwise by at least about 3 percent, and the composite web (24) undergoes a traverse winding into a roll.

25 Claims, 5 Drawing Sheets

METHOD AND APPARATUS FOR MAKING AN ELASTOMERIC LAMINATE WEB

FIELD OF THE INVENTION

The present invention relates to a method and apparatus for making an elastomeric web. More particularly, the invention relates to a method and apparatus for making an elastomeric laminate composite web having selected properties.

BACKGROUND OF THE INVENTION

Elastic composites have been prepared by attaching individual stretched elastomeric strands to a carrier web. The carrier web has been a polymer film or a fabric material. In particular techniques, the composite web with the stretched elastomeric strands have been wound into a form of a cylindrical roll for storage and transfer. In other techniques, elastomeric stranded laminates have also been made and traversely wound into a roll. Further techniques have employed a swirled or sprayed adhesive to attach the elastomeric strands to the carrier web. In particular arrangements, the elastomeric strands have been positioned at a spaced distance above the carrier web during the application of the adhesive.

Conventional techniques, such as those described above, have not been able to produce an elastomeric composite web at sufficiently high speeds. In addition, the elastomeric composite webs when wound into a roll have exhibited excessive amounts of elastic stress relaxation and have deteriorated during transport and storage. The conventional techniques have also been unable to accumulate sufficient amounts of the elastomeric composite web onto a single roll.

BRIEF DESCRIPTION OF THE INVENTION

The present invention provides a process for making an elastomeric web. Generally stated, the process includes moving a first web along an appointed machine-direction of the process, and delivering a plurality of elastomeric strands moving along the machine-direction. The elastomeric strands have been elastomerically stretched, and the plurality of elastomeric strands have been laterally distributed along an appointed cross-direction of the process. A second web is laminated to the first web with the elastomeric strands sandwiched between the first and second webs to provide an elastomeric laminate, composite web.

In particular aspects of the invention, the elastomeric strands have been stretched to an elongation of at least about 50 percent, and in other aspects, the composite web can be allowed to elastomerically contract lengthwise by at least about 3 percent. Additionally, the composite web can undergo a traverse winding to form a traverse-wound roll.

In further aspects of the invention, the elastomeric strands may be positioned at a spaced distance from the first web, and a meltblown adhesive can be applied to the elastomeric strands and the first web while the elastomeric strands are at the spaced distance from the first web. Accordingly, the elastomeric composite web can be operatively attached together with lesser amounts of the adhesive.

In its various aspects and configurations, the present invention can produce a desired elastomeric composite web at high speeds and can produce the composite web with lower amount of adhesive. The present invention can advantageously produce an elastomeric composite web which retains its desired properties when wound into the form of a roll. In addition, the present invention can produce a roll which contains greater amounts of the elastomeric composite web, and can wind the composite web into a roll which has more stability and has greater integrity to facilitate shipping and handling. In desired aspects, the invention can produce an elastomeric composite web which has improved appearance and more reliably retains desired properties during storage and transport. Thus, the present invention can generate a roll of composite web material which can more reliably exhibit the desired properties when the composite web is unwound from the roll. As a result, the present invention can provide an improved technique for producing a higher quality elastomeric composite web at higher speed, with greater efficiency and at reduced cost. In addition, the invention can provide a composite web which maintains desired properties, such as elastomeric properties, during storage.

BRIEF DESCRIPTION OF THE DRAWINGS

The present invention will be more fully understood and further advantages will become apparent when reference is made to the following detailed description and accompanying drawings in which.

DETAILED DESCRIPTION OF THE INVENTION

Figure 1:
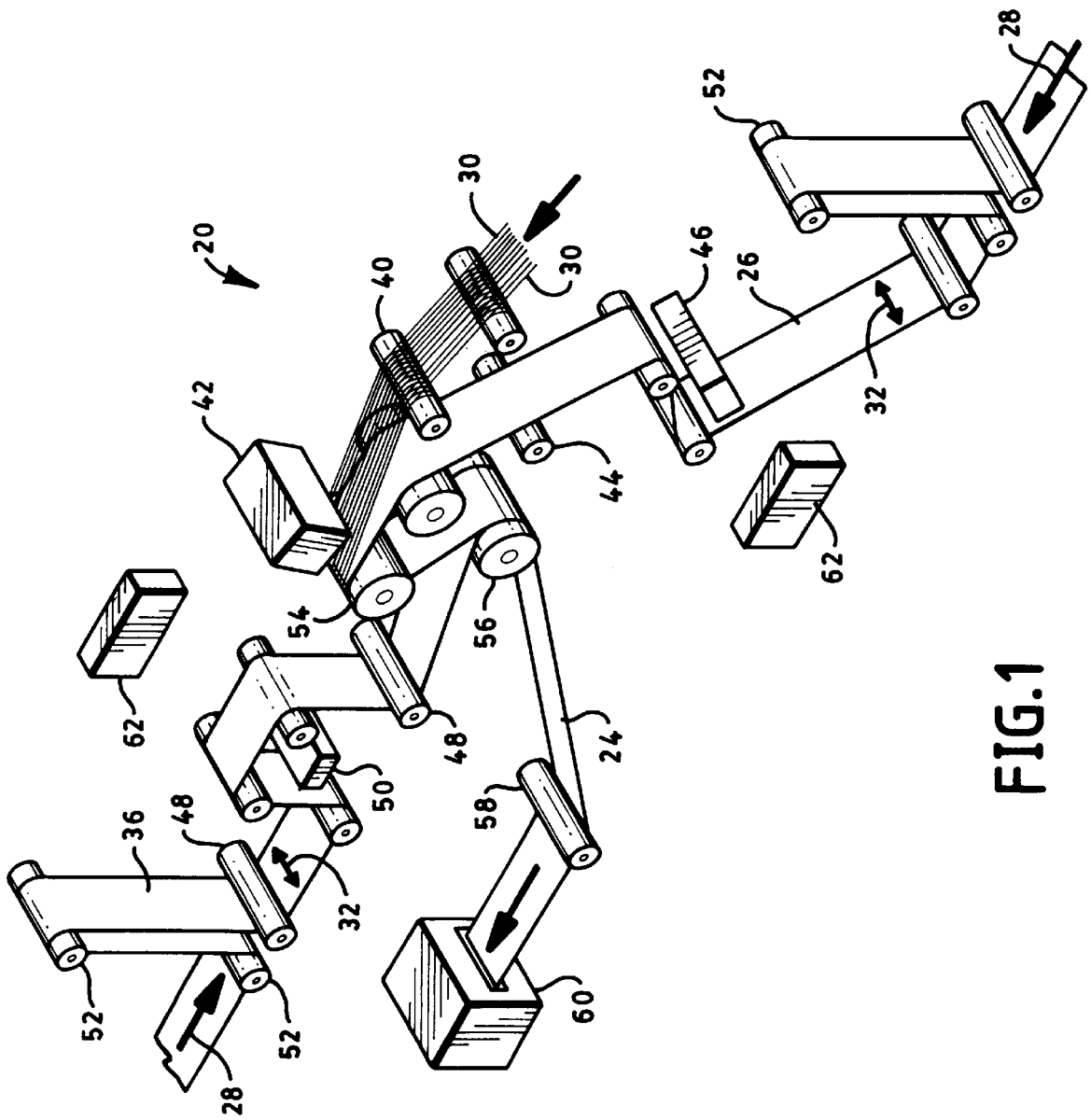
FIG. 1 shows a representative isometric view of the method and apparatus of the invention.
Figure 4:
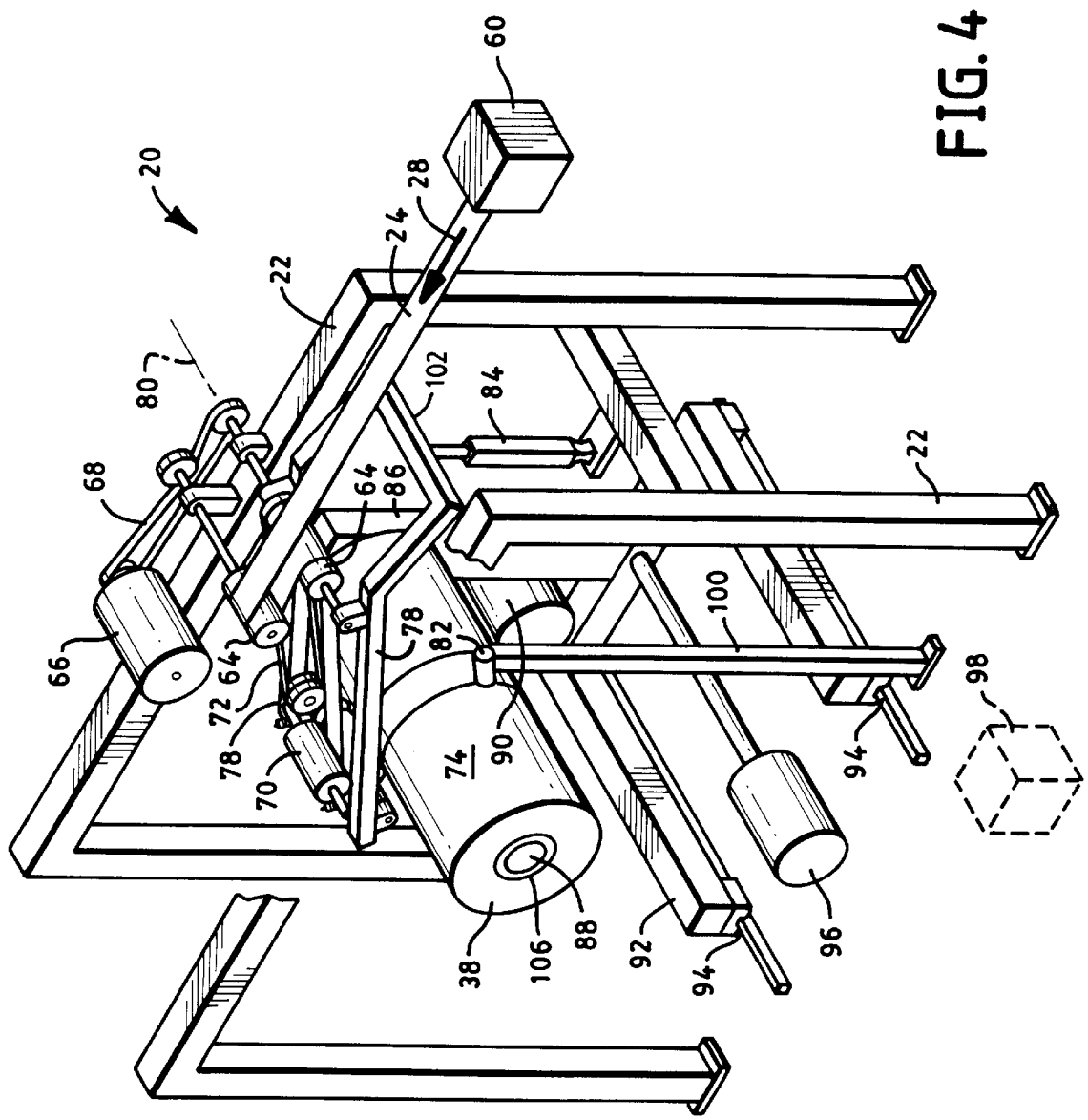
FIG. 4 representatively shows an isometric view of a winder section provided by the technique of the present invention.

With reference to FIGS. 1 and 4, a distinctive technique 20 for making an elastomeric web includes a moving of a first web 26 along an appointed, lengthwise machine-direction 28 of the shown process and apparatus, and a delivering of a plurality of elastomeric strands 30 which are moving along the machine-direction. The elastomeric strands 30 have been elastomerically stretched, and the plurality of elastomeric strands 30 have been laterally distributed along an appointed cross-direction 32 of the process and apparatus. Accordingly, the elastomeric strands have been laterally distributed along the cross-direction 32 of the first web 26. In particular aspects, the elastomeric strands have been stretched to an elongation of at least a minimum of about 50 percent (%). A second web 36 is laminated and operatively attached to the first web 26, with the elastomeric strands 30 sandwiched between the first and second webs to provide a stretched, elastomeric laminate, composite web 24. The composite web 24 is allowed to elastomerically contract lengthwise by a predetermined amount, and undergoes a traverse winding into a roll. In desired aspects, the composite web is allowed to elastomerically contract lengthwise by an amount of at least about 3 percent.

Figure 2:
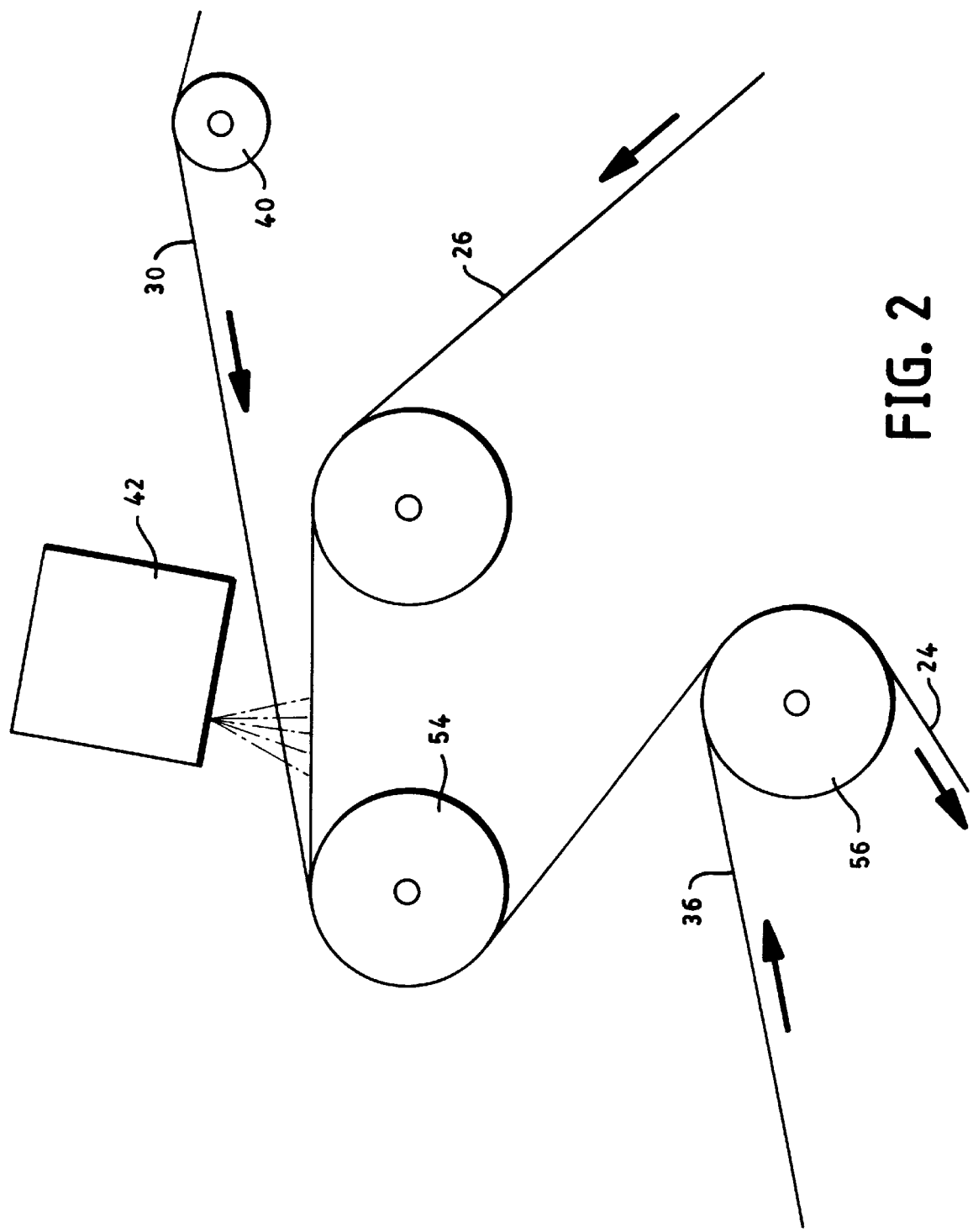
FIG. 2 representatively shows a schematic side view of an adhesive applicator section of the technique provided by the present invention.

The elastomeric strands 30 may be positioned at a spaced distance 34 from the first web 26, and an adhesive can be applied to the elastomeric strands 30 and the first web 26 while the elastomeric strands are at the spaced distance 34 from the first web 26, as representatively shown in FIG. 2. Accordingly, the composite web 24 can thereby be operatively laminated and attached together with the adhesive.

Figure 3:
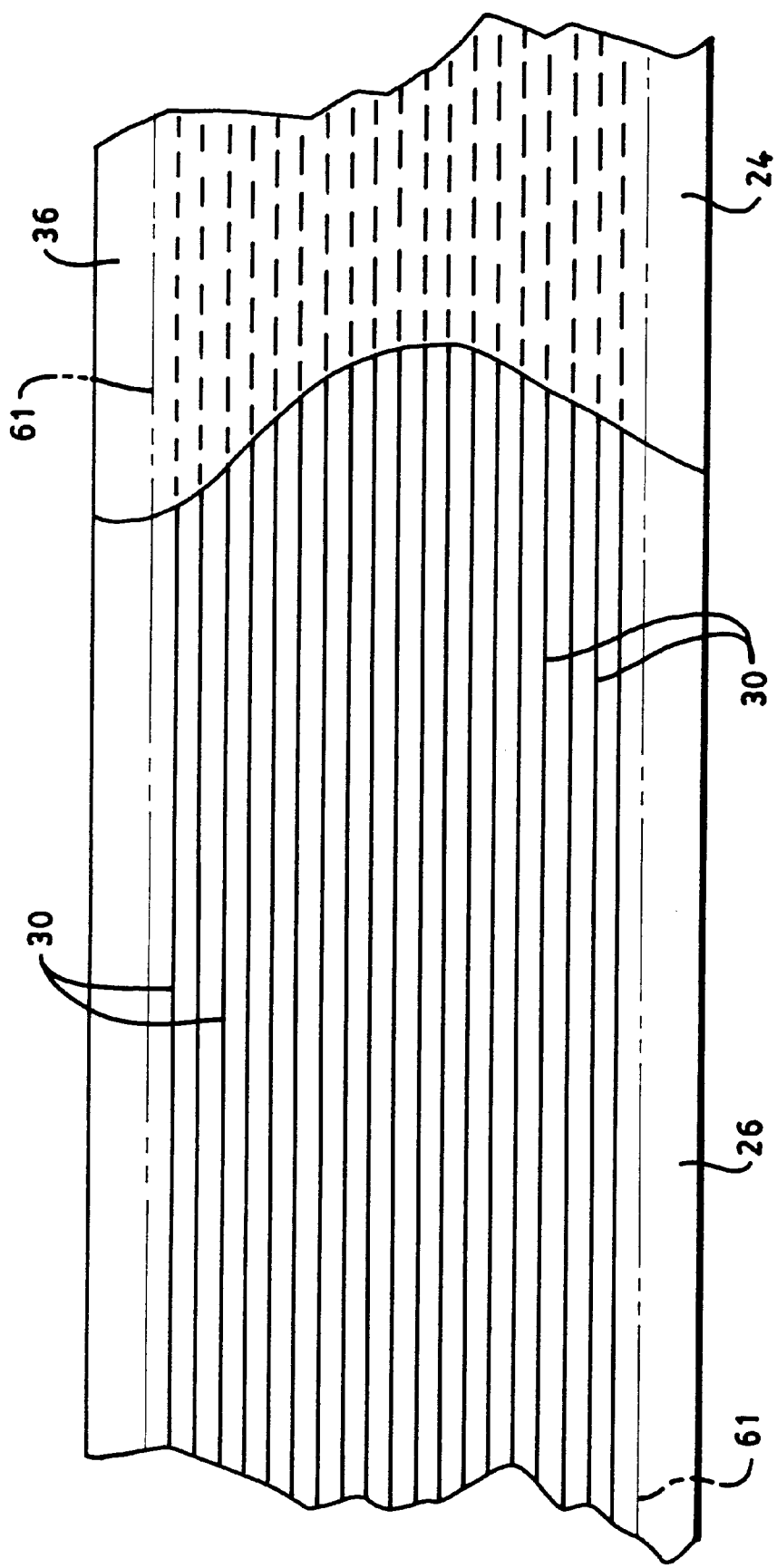
FIG. 3 representatively shows a partially cut-away, top view of a composite web having a substrate, first web with elastomeric strands which are individually spaced apart along the cross-direction of the substrate and composite web.

With reference to FIGS. 1, 2 and 3, a suitable transporting mechanism such as the illustrated system of transport rollers 44, are constructed and arranged to move and deliver the substantially continuous first web 26 along the appointed machine-direction 28 from a suitable supply of the first web 26, such as a supply roll or other bulk storage accumulation of the material. For the purposes of the present invention, the machine-direction 28 is the direction along which a particular component or material is transported along and through a particular, local position of the apparatus and method of the invention. In the shown configuration, the first web 26 is delivered and transported along the apparatus and process toward the location of an adhesive applicator 42.

A web guide mechanism 46 is employed to control the position of the first web 26 along a cross-direction 32 of the process. For the purposes of the present invention, the cross-direction 32 lies generally within the plane of the material being transported through the process and is aligned perpendicular to the local machine-direction 28. Accordingly, in the view of the arrangement representatively shown in FIG. 2, the cross-direction 32 lies perpendicular to the plane of the sheet of the drawing.

The first web 26 may be composed of various materials, such as polymer film webs, nonwoven fabric webs, and the like, as well as combination thereof. In the representatively shown configuration, the first web 26 is composed of a nonwoven fabric. The first web is desirably porous and can be a spunbond fabric, a meltblown fabric, a bonded-carded web fabric, a woven fabric, a porous film or the like, as well as combinations thereof. For example, the first web can be a spunbond fabric having a basis weight within the range of about 0.4 to 1.0 ounce per square yard (osy) (about 13.6 to 33.9 gsm (g/m$^2$)). In particular arrangements, the fabric can be made from a polypropylene homopolymer with a fiber size within the range of about 1.5 to 3.5 denier per filament. Additionally, web material may be pigmented with an appropriate color, such as white, pink or blue, and can contain about 25 to 200 ppm (parts per million by volume) of optical brightener, such as UVITEX OB optical brightener made by Ciba-Geigy, a business having offices in Greensboro, N.C. In a particular embodiment, the spunbond fabric has a weight of 0.6 osy (20.3 g/m$^2$) with a fiber denier of about 2, and includes 100 ppm of optical brightener.

A suitable transporting mechanism, such as the illustrated system of transport rollers 40, are configured to deliver a plurality of the substantially continuous elastomeric strands 30 to move along the machine-direction 28 from a suitable supply of the elastomeric strands. The elastomeric strands 30 have been elastomerically stretched to a lengthwise elongation of at least about 50%, and the plurality of elastomeric strands have been laterally distributed along the appointed cross-direction 32 of the process. The plurality of elastomeric strands 30 can have a nonparallel or substantially parallel distribution along the appointed cross-direction 32. For example, the elastomeric strands 30 can be distributed as individual strands which are aligned substantially parallel to each other and are spaced apart by a selected strand spacing distance. In desired aspects, the strand spacing distance can be at least a minimum of about 1 mm. Alternatively, the strand spacing distance can be at least about 2 mm, and optionally, can be at least about 3.5 mm to provide desired properties. In other aspects the strand spacing distance can be not more than a maximum of about 12 mm. Alternatively, the strand spacing distance can be not more than about 6 mm, and optionally, can be not more than about 4.5 mm to provide improved performance. In a desired embodiment, the strand spacing distance is about 4 mm. It should be readily appreciated that the present invention is typically arranged to place the elastomeric strands onto the first web 26 and into the composite web 24 with the inter-strand spacing distances described for the process and apparatus.

The elastomeric strands 30 can be composed of various types of elastomeric material. For example, the elastomeric strands may be composed of a type S-7 SPANDEX elastomer having a size within the range of about 100 to 700 denier, which is available from Globe Manufacturing Co., a business having offices located in Fall River, Mass. Alternatively, the elastomeric strands may be composed of a type XA LYCRA material having a size within the range of about 50 to about 470 decitex, which is available from DuPont, Inc., a business having offices located in Wilmington, Del. In a desired embodiment, the elastomeric strands are composed of the type S-7 SPANDEX elastomer with a size of about 210 denier.

Prior to delivery to the location of the adhesive applicator 42, the elastomeric strands have been tensioned and elastomerically stretched to an elongation of at least about 50%. Alternatively, the elastomeric strands have been elastomerically stretched to an elongation of at least about 75%, and optionally, have been elastomerically stretched to an elongation of at least about 100% to provide desired benefits. In further aspects, the elastomeric strands have been stretched to an elongation of not more than about 350%. Alternatively, the elastomeric strands have been elastomerically stretched to an elongation of not more than about 250%, and optionally, have been elastomerically stretched to an elongation of not more than about 150% to provide improved performance. Various conventional techniques that are well known in the art can be employed to impart the desired percent elongation to the elastomeric strands.

For the purposes of the present invention, the percent (%) elongation of the elastomeric strands can be determined by the following formula:

elongation=$100*(I_f-I_i)/I_i$;

where: $I_i$=initial unstretched length of the elastomer; and $I_f$=stretched length of the elastomer.

In addition, various conventional techniques that are well known in the art can be employed to provide and maintain the desired cross-directional distribution of the elastomeric strands 30. Examples of such techniques can include rotating grooved spacer rollers, stationary wire comb spacers, and the like, as well as combinations thereof.

Various types of conventional applicating or depositing techniques can be employed to deliver the selected adhesive to form the composite web 24. For example, air-depositing techniques such as spraying, meltblowing, swirling or the like, as well as combinations thereof, can be employed. Alternately, various contact techniques, such as slot, bead, or gravure coating of adhesive onto the substrates, may be employed.

In particular aspects of the invention, the adhesive applicator 42 is configured to apply and deposit the adhesive with a selected meltblowing technique. The meltblown technique can apply the adhesive in the form of a multiplicity of meltblown adhesive fibers, which can provide a more complete and uniform adhesive coverage, especially at the high speeds employed with the invention. In particular aspects of the invention, the speed of the first web 26 at the location of the adhesive applicator 42 can be at least a minimum of about 305 m/min. Alternatively, the web speed at the applicator section of the invention can be at least about 335 m/min, and optionally, can be at least about 381 m/min, or more, to provide improved performance.

For example, a series of experiments were conducted, as described below, and the experiments demonstrated the advantages of a melt blown technique and also demonstrated the improvements over the conventional swirl technique for applying adhesives. Using the conventional swirl adhesive applicator having two separate heads (with the nozzles slightly offset to achieve better coverage), one-half of the total adhesive flow was delivered to each of the applicator heads. Samples of the elastomeric laminate were made at two levels of adhesive add-on (7 and 10 g/m$^2$), and at various line speeds. For the adhesive add-on level of 10 g/m$^2$, the line speeds of the first web 26 at the adhesive applicator 42 were: 500, 700, 1000, and 1250 feet per minute ( 152, 213, 305, and 381 m/min, respectively). The samples were judged for adhesive quality by evaluating the approximate dimensions of any areas having no adhesive, and by evaluating whether or not there were any undesired "lanes" which were running in the MD (machine-direction) and contained no adhesive. The experimental results at the 10 g/m$^2$, adhesive add-on level were as follows:

| Speed (fpm) | Adhesive Quality Rating |
| --- | --- |
| 500 | fairly uniform, largest "no adhesive" areas ¼ to ½", "acceptable" quality |
| 700 | several MD lanes of "no adhesive", coarser pattern, "marginal" quality |
| 1000 | multiple continuous MD lanes of "no adhesive", very sporadic swirl shape, "unacceptable" quality |
| 1250 | same as at 1000 fpm but worse |

A second experiment was conducted at a total adhesive add-on level of 7 g/m$^2$ in a manner similar to that employed with the experiment conducted at the adhesive add-on level of 10 g/m$^2$, with the exception of the line speeds of the substrate, first web 26. In the second experiment, line speeds of the first web 26 were at 200, 400, and 800 fpm (61,122, and 244 m/min, respectively), and the air pressure and temperature were adjusted to achieve the best observed swirl quality available at each line speed. The second experiment provided the following results:

| Speed (fpm) | Adhesive Quality Rating |
| --- | --- |
| 200 | Very good coverage, largest "no adhesive" area approximately ¼ × ¼" |
| 400 | Still very good swirl, slightly coarser pattern compared with 200 fpm, "uacceptable" |
| 800 | Slight MD lanes of "no adhesive", ½ × ½" "no adhesive areas, coverage is "too coarse, unacceptable" |

Thus, at the 7 g/m$^2$ adhesive add-on amount, the conventional swirl technique provided acceptable performance only under at process speeds which were significantly less than 800 fpm (244 m/min).

In comparison, the technique of the invention configured with a single DURAFIBER meltblown adhesive head obtained from J&M Laboratories, successfully provided the elastomeric composite laminates with "excellent" adhesive coverage, even at an adhesive add-on amount of 4 g/m$^2$ and at a line speed of 1250 fpm.

Thus, an adhesive applicator 42 which is configured for meltblowing adhesive in accordance with the technique of the invention can advantageously provide a more precise control of the side edges of the area of applied adhesive. In addition, the meltblowing applicator can provide a more uniform distribution of the adhesive, especially along the cross-direction 32 when the target materials, such as the elastomeric strands 30 and the first web 26, are moving at high speed. As a result, the elastic strands can be more consistently and more reliably attached and sandwiched between the first web 26 and the second web 36. In addition, the more effective and more uniform adhesion can be produced with a lower, total amount of adhesive add-on.

The adhesive applicator 42 can be selected from various types of suitable applicator mechanisms. For example, the adhesive applicator may be a METERED AMBI MELT BLOWN applicator available from J & M Laboratories , a business having offices located in Dawsonville, Ga. Alternatively, the adhesive applicator may be a DURAFIBER applicator available from J & M Laboratories, or a CONTROL COAT MELT BLOWN applicator available from Nordson, Inc., a business having offices in Norcross, Ga.

The representatively shown arrangement employs a single applicator mechanism. Alternatively, a system having a plurality of two or more individual adhesive applicators or applicator nozzles may be employed. The applicators can be arranged in a selected array to adjust and control the desired distribution of the applied adhesive over the laminated area of the composite web assembly.

At a selected process location, particularly at the location of the adhesive applicator 42, the elastomeric strands 30 are positioned at a desired, spaced separation distance 34 from the first web 26, as representatively shown in FIGS. 1 and 2. In particular aspects of the invention, the elastomeric strands 30 are positioned relatively above the first web 26 by a selected separation distance 34 which is at least a minimum of about 2 mm. Alternatively, the separation distance can be at least about 6 mm, and optionally can be at least about 12 mm to provide desired benefits. In other aspects, the separation distance 34 can be not more than a maximum of about 75 mm. Alternatively, the separation distance can be not more than about 50 mm, and optionally can be not more than about 19 mm to provide improved performance.

The predetermined separation distance between the elastomeric strands 30 and the first web 26 can allow the applied adhesive to contact the elastomeric strands and the first web 26 in a substantially simultaneous operation. In desired aspects, the applied adhesive can be in the form of adhesive filaments or fibrils which substantially wrap around the outer surface contours of the individual elastomeric strands to provide a more secure adhesive attachment of the elastomeric strands to the first web 26 and/or the second web 36.

In other aspects of the invention, the adhesive can be applied in a selected add-on amount which is at least a minimum value of about 1 grams of adhesive per square meter of the adhesive application (1 g/m$^2$). Alternatively, the adhesive amount can be at least about 2 g/m$^2$, and optionally can be at least about 3 g/m$^2$ to provide desired benefits.

Further aspects of the invention can provide an adhesive amount which is not more than a maximum value of about 25 g/m$^2$. Alternatively, the adhesive amount can be not more than about 10 g/m$^2$, and optionally can be not more than about 5 g/m$^2$ to provide improved benefits. In a preferred configuration, the adhesive add-on amount is about 4 g/m$^2$.

The reduced amount of adhesive can advantageously reduce the tendency of the composite web 24 to adhere to itself when the composite web is wound onto the roll 38. When there is excessive adhesion between the wound layers of the composite web 24, it can be excessively difficult to unwind the composite web from the roll for further processing. The adhesive can excessively migrate to adjacent layers within the wound roll, and can degrade the quality of the material.

The adhesive delivered by the adhesive applicator 42 can be composed of various types of suitable materials. Such adhesive can include the conventional types of adhesives employed to attach elastic or elastomeric materials, and are well known in the art.

In desired configurations, the applied adhesive is a hot melt, pressure sensitive adhesive, such as H-2525A adhesive available from Ato Findley, a business having offices located in Wauwatosa, Wis. Alternatively, the adhesive can be NA 34-5611 material, which is available from National Starch, a business having offices in Bridgewater, N.J.

The elastomeric strands 30 and the first web 26 can be delivered to a mechanism which contacts and operatively assembles the elastomeric strands 30 onto the first web 26. For example, the first web and elastomeric strands can be operatively transported and delivered to a chill roll 54 upon which the elastomeric strands are pressed against and adhered to the first web 26. In addition, the chill roll can cool the assembled components to reduce the chances of melting or otherwise thermally degrading the materials contacted by the adhesive.

A suitable transporting mechanism, such as provided by the representatively shown system of transporting rollers 48, can be configured to deliver the substantially continuous second web 36 from a suitable supply, such as a supply roll or other conventional, bulk storage configuration. The second web may be composed of various types of materials, such as polymer films, nonwoven fabrics, and the like, as well as combinations thereof. In particular aspects of the invention, the process can be constructed to provide the polymer film web in a configuration which is substantially liquid impermeable. In another aspect, the process can be arranged to provide the polymer film web in a configuration which is air permeable and breathable. In desired aspects, the second web 36 can be a polymer film composed of polyethylene, such as a type TXEM 619.2 material available from Consolidated Thermoplastics Co., a business having offices located in Chippewa Falls, Wis. Alternatively, the second web 36 may be a polyethylene film composed of type TXEM 649.0 material available from Consolidated Thermoplastics Co. a business having offices located in Chippewa Falls, Wis. Alternately, the web may be composed of a "breathable" film, such as an EXXAIRE type XBF 302 W material, available from Exxon Chemical Co. a business having offices in Lake Zurich, Ill., or of various polypropylene-based films, such as type XSF 363 available from Consolidated Thermoplastics Co., a business having offices in Chippewa Falls, Wis. In a particular embodiment, a type TXEM 619.2 film obtained from Consolidated Thermoplastics Co., with an average thickness of about 0.75 thousandths of an inch (about 0.19 mm) was employed.

Various conventional techniques can be employed to maintain a desired tension within the first web 26 and/or the second web 36. For example, a conventional system of dancer rollers 52 maybe employed to control the tension within the second web 36. In addition, various conventional techniques can be employed to regulate and control the relative positioning of the second web 36 along the appointed cross-direction 32 of the process. In the illustrated arrangement, a suitable web guide 50 is employed to provide the desired cross-directional positioning and alignment of the second web 36 during the operation of laminating the second web into the composite web 24.

In the illustrated configuration, the selected delivery rollers 48 direct the second web 36 to a suitable assembly device, such as provided by the representatively shown assembly roll 56. The combination of the elastomeric strands 30 and the first web 26 are also directed and moved to the location of the assembly roll 56. At the assembly roll of the shown configuration, the second web 36 can be laid onto the peripheral surface of the rotatable assembly roll. Then, the first web 26 and the elastomeric strands 30, along with the applied adhesive can be brought on top of the second web 36 to contact and laminate with the second web. The elastomeric strands 30 are thereby sandwiched between the first web 26 and the second web 36 to provide the elastomeric laminate, composite web 24 which is operatively attached together with the applied adhesive.

A suitable system of web guide controllers 62 are operatively connected to the web guides 46 and 50 to control the desired positioning of the first web 26 and the second web 36, respectively. Various types of conventional web guide controllers can be employed. For example, a suitable web guide controller can be a model CDP-01-M which is available from Fife, Inc. a business having offices located in Oklahoma City, Okla.

A suitable transporting mechanism, such as provided by the illustrated system of transport rollers 58, can operatively direct and move the composite web 24 for further processing. For example, the composite web can be delivered to a slitter mechanism 60 which can operatively slit the composite web 24 along appointed cutting (or other type of dividing) lines 61 (FIG. 3) which extend along the machine-directional length of the composite web. In particular, the slitter device can slit and remove any unbonded edge portions of the assembled composite web, and can create a laminate which has a desired width, and contains a desired number of elastomeric strands.

Alternative aspects of the invention can also include multiple slitting devices which are configured to create a plurality of two or more lanes of slit, composite laminate web material 24. Each of the lanes of composite web material can be individually wound into rolls by an array of winders comprising a corresponding plurality of two or more traversing winder systems. As a result, the lateral side edges of each composite web 24 can be neatly trimmed, and can be substantially free of loose, floppy layers of material. In addition, each composite web 24 can be configured to be substantially free of exposed elastic strands along its terminal, laterally opposed side edges. Since each of the composite webs 24 has neatly trimmed edges which are substantially completely laminated and bonded together, each composite web 24 can be wound into a roll having a more consistent and more uniform profile.

Figure 5:
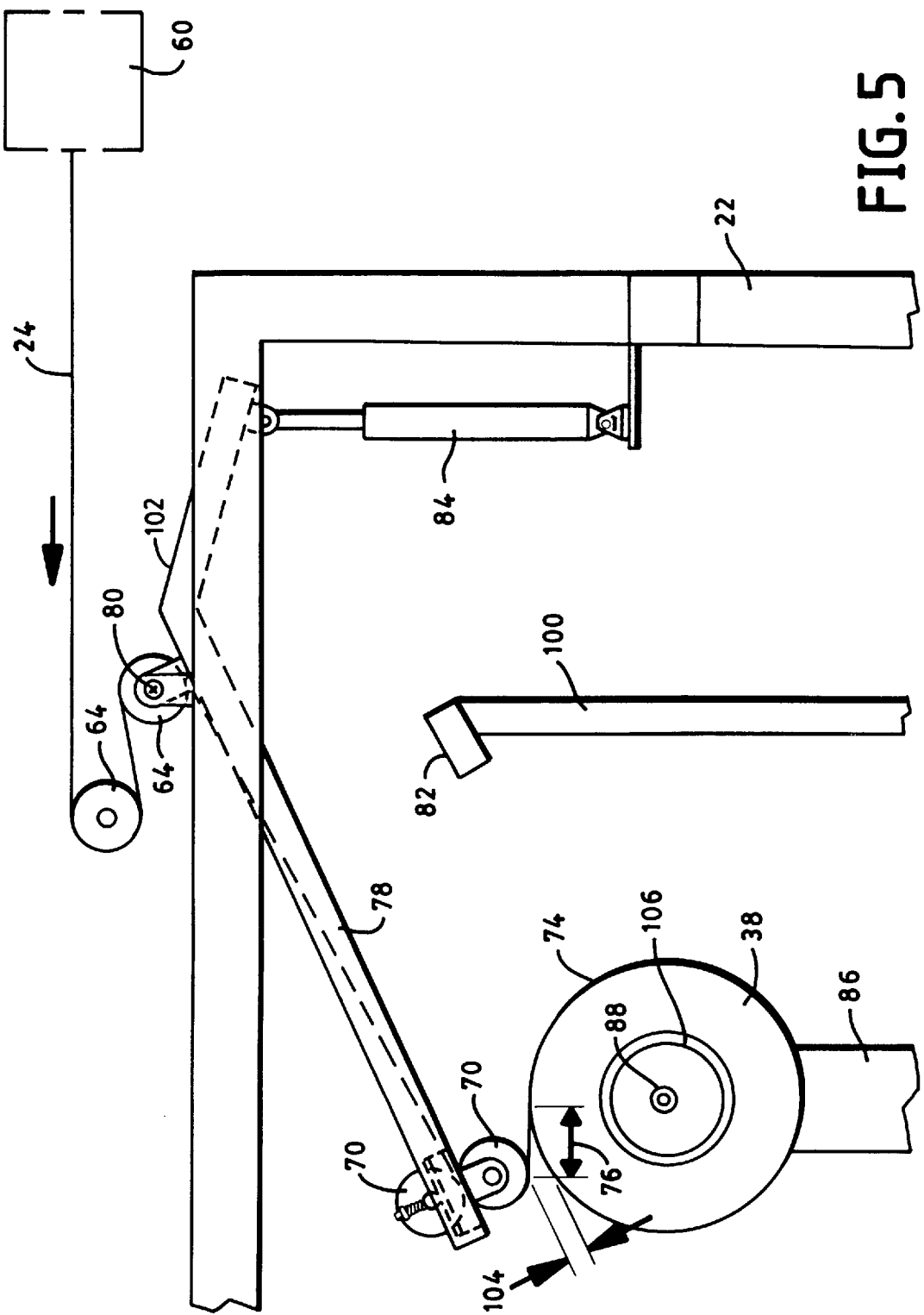
FIG. 5 representatively shows a schematic side view of the winder section provided by the technique of the present invention.

With reference now to FIGS. 4 and 5, the composite web 24 can be delivered from the slitter mechanism 60 along the machine-direction 28 to a distinctive winding system. In the illustrated embodiment, the composite web 24 is operatively directed and transported to a system of s-wrap, drive rollers 64. A suitable driving system, such as a drive motor 66 and a system of drive belts 68 are configured to turn the s-wrap rollers at a desired rotational speed. Accordingly, the composite web 24 can be directed and transported around the s-wrap rollers along a substantially S-shaped path, and directed and transported to an appointed delivery location. In the illustrated configuration, for example, the delivery location is positioned at a nip region between a pair of counter-rotating, feed nip rollers 70. The nip rollers 70 are operatively driven at a selected rotational speed by a suitable driving mechanism. In the representatively shown configuration, for example, the illustrated drive motor 66 is connected by the cooperating system of drive belts 68 and 72 to operatively counter-rotate the nip rollers 70 in the desired directions and at the desired rotational, angular speeds.

The representatively shown configuration of the invention has the nip rollers 70 rotatably mounted onto the distal end of a support arm 78. The support arm is pivotally mounted to rotate about a support pivot axis 80, and includes an extending actuator arm section 102. In the shown configuration, the support pivot axis 80 is mounted on a base frame support 22. A suitable actuating mechanism, such as the representatively shown linear actuator 84 can be mounted on the support frame 22 and configured to operatively engage the actuator arm section 102 of the pivotable support arm 78. A suitable operation of the actuator 84 can thereby operatively move the delivery nip location of the nip rollers 70 to maintain a desired contraction spacing distance 76 between the delivery location which is provided by the nip rollers 70, and the peripheral winding surface 74 which is developed on the outer circumferential surface of the roll 38 and is continually and/or continuously generated during the winding of the composite web 24.

The representatively shown winding system includes a winder spindle 88 which is mounted on a suitable roll support 86. The spindle 88 is rotatably driven by a suitable driving mechanism, such as the representatively shown spindle motor 90. In the illustrated configuration, a driving belt is operatively connected to transmit the driving force from the spindle motor 90 to the winder spindle 88. Alternatively, other conventional transmission systems may be employed. The rotational speed of the spindle motor 90 and the winder spindle 88 can be regulated with a suitable motor control 98. The illustrated spindle support 86 is mounted on a support base 92, and the support base is operatively mounted on an operative guide mechanism, such as the shown pair of linear slides 94. A suitable traversing mechanism, such as the shown traversing motor 96, is operatively connected to move and traverse the support base 92 along the cross-direction 32 of the process. The traversing motor is operatively configured and connected to provide a desired pattern of oscillating movement which operably traverses the roll 38 back and forth along the linear slides 94 in a conventional manner well known in the art to produce a substantially continuous, traversing winding of the composite web into the form of the desired traverse wound roll 38.

It should be readily understood that alternative systems may be employed to provide the desired, relative motion between the component parts to achieve the intended traverse winding. For instance, one may traverse the complete base plate of the apparatus, or may traverse the path of the composite web 24 to achieve the same results. Examples of motor devices suitable for use in the winding mechanism of the present invention include Reliance part numbers B18H1070 and P14A5805, which are available from Reliance Electric Co., a division of Rockwell Automation having offices located in Cleveland, Ohio.

As the composite web 24 gradually accumulates into the wound roll 38, there is provided a peripheral surface 74 which extends along the circumferential and axial dimensions of the wound roll 38. As the wound roll 38 gradually increases in diameter during the winding process, the radial position of the winding surface 74 continually changes, relative to the rotational axis of the winding spindle 88. To effectively regulate and maintain a desired surface speed at the peripheral winding surface 74, the technique of the invention advantageously incorporates a distinctive detecting and measuring system. A desired arrangement of the measuring system can include a sensor device 82 mounted on a suitable support, such as the illustrated sensor support 100. The measuring system can, for example, advantageously monitor the relative, radial distance between the winding surface 74 and the axis of the winding spindle 88. Various types of sensor devices may be employed. The sensors may be contact sensors, non-contact sensors or combinations thereof. For example, the shown configuration of the measuring system can comprise a non-contact sensor 82 which includes a sonic sensor, such as provided by a pulse, ultrasonic sensor system. A suitable ultrasonic sensor is a PULSONICS Model 5000 sensing device which is available from Cleveland Motion Controls, Inc., a business having offices located in Cleveland, Ohio.

It should be readily appreciated that alternative configurations of the invention may incorporate other types of detecting and measuring systems to help regulate the various operations and components of the invention. For example, the detecting system may by provided by a laser system, a radar system, a light sensing photoeye system, a capacitive proximity sensing system, an optical camera system, a weigh cell system, a load cell system, a dancer bar mechanism, a contact arm attached to a transducer, or the like, as well as combinations thereof.

The instantaneous diameter of the wound roll 38, or other indicator of the relative position of the winding surface 74 with respect to other selected components of the winding system, can be determined from the data generated by the particular detecting system employed with the chosen configuration of the invention. For example, conventional algorithms known in the art can be employed to calculate the instantaneous diameter of the wound roll 38 during the winding process by employing appropriate set-up parameters, such as the diameter of the empty winding core 106 prior to the winding operation, the distance of the sensor 82 away from the surface of the empty winding core, the distance of the sensor 82 away from the surface the roll 38 when the roll is fully wound, the instantaneous speed of the winding surface 74, the instantaneous weight of the wound roll 38, and the like, as well as combinations thereof. The particular set-up parameters will depend upon the particular measuring system employed with the selected configuration of the invention.

When employing the representatively shown non-contact measuring system, the parameters employed are the core diameter, the distance from the head of the sensor 82 to the surface of the empty core, and the predetermined distance from the sensor head to the surface of a fully wound roll. The speed of the roll surface 74 is then controlled with a conventional speed loop with diameter scaling. In particular aspects of the invention, the winding roll surface speed is controlled to be substantially constant. Desirably, the winding roll surface speed is regulated to have a variation of about plus-or-minus (+/−) 1 percent. Alternatively, the winding roll surface speed could be varied as a function of the diameter of the roll 38. The variation of the surface speed may be in accordance with a linear or non-linear function of the diameter of the wound roll 38, as desired.

In the representatively shown arrangement of the invention, the sensor 82 incorporates known ultrasonic technology to determine the distance from its sensor head to the winding surface 74. Electronic data signals corresponding to this distance can be continually updated and inputted into an appropriate electronic processor, such as an operative control computer, where a series of algorithms are employed to filter the signals. Examples of suitable types of filtering techniques include sampled average, running average, exponential average and the like.

In the shown configuration, a running average with a sample size less than a predetermined "window" was employed. The software "window" includes a routine which selects when an appointed portion of the data signal from the sensor 82 will be passed to the particular algorithm employed to calculate the then-current diameter of the roll 38. The shown configuration of the invention is arranged to pass only the filtered signals which are generated during an appointed software "window" which occurs when a selected section of the roll 38 passes by the sensor 82. In particular, the selected section is a medial portion of the axial length of the roll which measures about 2 inches (about 5.1 cm) along the longitudinal axis of the spindle 88. The "window" can, for example, be arranged to be "open" only when the spindle is traversing a selected, single direction of the oscillating, back-and-forth motion of the traversing spindle. It should be readily appreciated that other "windows" may be chosen, and that other routines may be chosen for determining when the "window" is "open".

The stretched elastomeric strands 30 tend to retract and gather the composite web and thereby impart elastomeric properties to the composite web. The gathered web, however has increased bulk and thickness, and relatively less of the web can be stored on a roll of given diameter. Accordingly, it has been desirable to wind the composite web in its fully stretched conditioned to increase the storage efficiency. Such a storage condition, however, can excessively degrade the properties of the composite web.

To better maintain and preserve the properties of the composite web 24 while also increasing the storage efficiency of the wound roll 38, the technique of the invention can advantageously be configured to allow the composite web 24 to elastomerically contract lengthwise by at least about 3 percent. Alternatively, the composite web 24 is allowed to elastomerically contract length wise by at least about 5 percent and optionally, is allowed to elastomerically contract lengthwise by at least about 6 percent to provide improved performance. In further aspects, the composite web 24 can be allowed to elastomerically contract lengthwise by an amount which can be up to about 10 percent. Alternatively, the composite web 24 can be allowed to elastomerically contract lengthwise by an amount which can be up to about 25 percent, and optionally, can be up to about 75 percent, or more to provide desired benefits. In still further aspects, the selected amount of appointed contraction is imparted prior to the winding of the composite web 24 into the wound roll 38. Desirably, the appointed amount of contraction is imparted substantially immediately prior to the winding of the composite web 24 into the wound roll.

The selected amount of allowed contraction of the composite web 24 can advantageously help avoid the accumulation of excessive stresses within the wound roll 38 which might collapse the roll or otherwise cause the roll to undergo undesired deformations. To provide the desired percent contraction, the contraction separation distance 76 is desirably configured to be at least a minimum of about 0.5 cm. Alternatively, the contraction separation distance can be at least about 9 cm, and optionally, can be at least about 15 cm to provide improved performance. In further aspects, the contraction separation distance 76 can be not more than a maximum of about 200 cm. Alternatively, the contraction separation distance can be not more than about 66 cm, and optionally, can be not more than about 30 cm to provide desired benefits. The technique of the present invention can advantageously provide and maintain the selected amount of elastomeric contraction through substantially the entire wound roll 38.

In a particular aspect of the invention, the circumferential winding speed at the periphery of the roll 38 is operatively controlled to thereby allow the composite web 24 to contract in cooperation with the traverse winding operation. In particular, the winding speed at the peripheral winding surface 74 is desirably controlled in the following manner.

The speed of a selected component of the invention is employed as a master machine reference. For example, the shown configuration employs the surface speed of the assembly roll 56 as the master machine reference. Accordingly, all other driven points in the process along the web path are referenced from the speed of the master machine reference provided by the assembly roll 56. In the illustrated arrangement, the web is controlled using a cascaded draw (where the operation of each draw point is configured relative to the driven point upstream of that draw point). Other alternative arrangements may employ a non-cascaded draw, a tension control, or the like, as well as combinations thereof. In the representatively shown configuration, no compensation for web tension changes are made. Alternative configurations, however, may employ components which provide such compensation. The draw from the assembly roll 56 to the winder feed nip rollers 70 is relatively flat (the web speed provided by the nip rollers is approximately 100 percent of the web speed at the assembly roll). The draw of the winder spindle 88 relative to the winder feed nip rollers 70 is set to yield the desired amount of composite web contraction, as described previously. More particularly, the angular speed of the spindle 88 is regulated to provide a web speed at the peripheral surface 74 which is less than the web speed provided at the nip rollers 70 by a set amount. The surface speed of the wound roll surface 74 is controlled to maintain this set draw throughout the build-up of the roll. In the shown configuration, this is accomplished by knowing the surface speed at the nip between the feed rollers 70, the set draw of the winder spindle 88 and the calculated diameter (as previously described) of the wound roll 38, and appropriately adjusting the rotational, angular speed of the motor which drives the winding spindle 88.

The contraction distance 76 is also controlled using the calculated diameter in addition to the speed of the surface 74 of the wound roll. A set, delivery separation distance 104 is provided and maintained to achieve the desired contraction distance 76. This set separation distance can be maintained to be substantially constant throughout the roll build-up by appropriately moving the location of the delivery location provided by the shown nip rollers 70. More particularly, the set distance 104 is maintained by suitably rotating the support arms 78 about their pivot axis 80. Various mechanisms including linear or non-linear actuator devices, such as stepper motors, 3-phase motors, servo motors, pneumatic cylinders, hydraulic cylinders, and the like may be employed to provide the desired rotation. In the representatively shown arrangement, the set delivery distance 104 is regulated by controlling the stroke position of the linear actuator 84. A suitable linear actuator is Model Number ND-1208A-12-MP2-FC2-Q-L which is available from Industrial Devices Corporation, a business having offices located in Novato, Calif. This is accomplished by determining and selecting the desired separation distance 104, calculating the current diameter of the wound roll 38, knowing the lever-arm distance between the nip rollers 70 and the pivot axis 80, knowing the lever-arm distance between the actuator 84 and the pivot axis 80, and activating the linear actuator 84 to move a distance which generates the required repositioning of the nip rollers 70.

To provide the desired contraction distance 76, the delivery separation distance 104 is desirably selected to be at least about 0.2 cm. Alternatively, the separation distance 104 can be at least about 2.5 cm, and optionally can be at least about 5 cm to provide improved performance. In further aspects the delivery separation distance can be up to about 200 cm or more. Alternatively, the separation distance 104 can be not more than about 30 cm, and optionally can be not more than about 10 cm to provide desired benefits. In desired aspects, the separation distance is substantially continuously or continually maintained during the operation of the invention. An allowable variance in the separation distance 104 may be up to about +/− 5 cm or more, particularly when the separation distance 104 is relatively long, but the variance is desirably less than about +/− 1 cm.

Accordingly, a further aspect of the invention includes controlling a delivery speed of the composite web 24 at an appointed delivery location and maintaining the delivery location at a predetermined delivery separation distance 104 away from the outer peripheral winding surface 74 produced on the wound roll 38. In a particular configuration, the controlling of the delivery speed of the composite web at the appointed delivery location includes a moving of the composite web with a delivery roller which is rotated at an angular rate which operatively provides the desired delivery speed. In the representatively shown configuration, for example, the controlling of the delivery speed of the composite web at the appointed delivery location includes a moving of the composite web 24 through the delivery nip positioned between the counter-rotating pair of delivery nip rollers 70. The delivery nip rollers are operatively rotated at an angular rate which provides the desired delivery speed.

In a particular aspect of the invention, the maintaining of the delivery location, such as the location of the nip rollers 70, at the predetermined delivery separation distance 104 can include a moving of the delivery location away from a winding axis of the roll 38 in correspondence with an increased diameter of the roll 38 produced by the winding operation. In particular, the separation distance 104 between the rollers 70 and the instantaneous winding surface 74 of the roll 38 can be maintained at a selected, substantially constant value by regulating and selectively moving the position of the nip rollers away from the rotational axis of the winding spindle 88 during the winding operation.

Another aspect of the invention maintains the delivery location at the predetermined separation distance 104 by incorporating a rotating of the support arm 78 about its support pivot axis 80. The support arm 78 is operatively connected and configured to thereby travel along an arcuate path to rotationally carry and move the delivery location provided by the nip rollers 70.

Still another aspect of the invention includes a detecting of the diameter of the wound roll 38 and a cooperative moving of the delivery location away from the rotational axis of the winding spindle 88 in a selected correspondence with the increasing diameter of the roll 38. In addition, the technique of the invention can include a regulating of a rotational, angular speed of the roll 38 in correspondence with the detecting of the diameter of the roll.

As mentioned above, an operative control system is employed to receive the data from the selected sensors and detectors, and to generate appropriate control signals to operatively regulate the appropriate components and process operations. In the shown configuration, for example the control system receives the data from the sensor 82 and generates responsive signals to regulate the speed of the spindle drive motor 90, and regulate the movement of the actuator 84. A suitable industrial-grade, computerized control system is the AUTOMAX Distributed Control System available from Reliance Electric Co., a division of Rockwell Automation having offices located in Cleveland, Ohio.

The distinctive combination of applying the adhesive, winding the composite web 24 into the wound roll 38, and allowing of the composite web 24 to elastomerically contract a selected percentage amount are cooperatively configured to provide the composite web 24 with an elastic stress relaxation value which is not more than about 7 percent loss. Alternatively, the elastic stress relaxation value can be not more than about 33 percent loss, and optionally, can be not more than about 58 percent loss to provide improved performance.

The elastic stress relaxation value can be determined with the following procedure. Traverse wound rolls of laminate were made having different levels of retraction at the winder. In one experiment, three levels of retraction were evaluated: A. 0–1 percent, B. 3.5 percent, and C. 6 percent retraction, where the percent (%) retraction is defined by the formula:

% retraction=100*(LS−WS)/LS;

where: LS=lamination speed, and
  WS=winder surface speed.

For example, if the lamination speed is 1000 feet/minute (305 m/min), and the winder surface speed is 900 feet/minute (274 m/min), the percent retraction is 10%. The rolls of laminate were stored for 14 days at 130 degrees Fahrenheit after which the samples were taken for tension testing.

The tension loss values were calculated by using the following formula:

percent tension loss=100*($t_0$−$t_a$)/$t_0$ where
  $t_0$=the initial tension before aging and
  $t_a$=the tension after aging.

It is readily apparent that the percent tension loss will have a positive value if $t_a$ is less than $t_0$. If $t_a$ is greater than $t_0$, the percent tension loss will have a negative value.

The results showed a tension loss due to stress relaxation as follows:

| Retraction | Percent Tension Loss |
|---|---|
| 0–1% | 58% |
| 3.5% | 7% |
| 6% | −21% |

As can be seen, the tension loss at low levels of winder retraction are clearly unacceptable, having lost 58 percent of the initial tension.

In a further aspect of the invention, the various operations incorporated by the technique of the invention are cooperatively configured to provide the composite web (24) with an internal cohesion value which is at least at minimum of about 3 kg/in$^2$ (about 4.5*10$^4$ Pascals (Pa)). Alternatively, the internal cohesion value can be at least about 4 kg/in$^2$ (about 6.1*10$^4$ Pa), and optionally can be at least about 6 kg/in$^2$ (about 9.1*10$^4$ Pa) to provide desired benefits.

A suitable technique for determining the internal cohesion is similar to and based upon that set forth in TAPPI T541 (Internal Fiber Bond Test) and includes the following: A laminate sample of the composite web 24 is provided that measures at least 2"×4" (5 cm×10 cm), with the long dimension running in the lengthwise, machine-direction of the web. A piece of two-sided adhesive tape, such as SCOTCH brand #406 tape, measuring 2"×4" (5 cm×10 cm) is attached to the bottom platen, which has face dimensions of 2"×4" (5 cm×10 cm). The bottom platen is attached to a pneumatic cylinder and controller which are cooperatively arranged to provide contact and separation forces between the test fixtures, two-sided tape and the samples. The laminate sample is placed over the tape on the bottom fixture, and a pressure of 6.11 psi ($4.2 \times 10^4$ Pa) is exerted for 3 seconds to attach the sample to the test fixture. Another quantity of the same two-sided tape is attached to cover the upper platen which has the dimensions of 1"×1" (2.54 cm×2.54 cm). The upper platen, which has face dimensions of 1"×1" (2.54 cm×2.54 cm), is then pressed against the laminate sample for 10 seconds with a pressure of 48.91 psi ($3.4 \times 10^5$ Pa). The movable upper fixture is then attached to a suitable force gauge (such as a Model DFIS 25 digital force gauge available from the Chatillon Company, a business having offices in Milwaukee, Wis.), and the two platens are caused by the pneumatic cylinder to separate at a rate of 12 inches per second (30.48 cm/sec) to cause the laminate layers to separate. The force of separation is recorded as the "internal cohesion" with units of measure of $kg/in^2$; where 1 $kg/in^2$ = $1.52 \times 10^4$ Pa.

In another aspect of the invention, the various operations incorporated in the technique of the invention are cooperatively configured to provide the composite web with a tension value of at least about 1 gram per millimeter of cross-directional width (about 1 g/mm). Alternatively, the tension value can be at least about 1.3 g/mm, and optionally can be at least about 1.5 g/mm to provide improved benefits. In another aspect, the tension value of the composite web 24 can be not more than about 3 g/mm. Alternatively, the tension value can be not more than about 2.5 g/mm, and optionally, can be not more than about 2 g/mm to provide improved performance.

In a further aspect of the invention, the composite web may be provided with a tension value of at least about 4.3 grams per strand of elastomer (4.3 gm/strand). Alternatively, the tension value can be at least about 5.7 gm/strand, and optionally can be at least about 6.5 gm/strand to provide improved benefits. In another aspect, the tension value of the composite web 24 can be not more than about 13 gm/strand. Alternatively, the tension value can be not more than about 10.9 gm/strand, and optionally, can be not more than about 8.7 gm/strand of elastomer to provide improved performance.

A suitable technique for determining the tension value is the following procedure. A sample of the composite laminate web 24 is elongated to a "flat out" condition to remove the shirring caused by the elastomeric strands. The term "flat out" is used to describe the condition at which all of the shirring is removed, but before which the laminate sample begins to "neck-in" or get narrower due to the load exerted to remove the shirring. The sample is suspended from a first stationary clamp. A second clamp having a weight sufficient to flatten the sample is attached to the other end of the sample. As will be generally understood, the weight of the second clamp will need to be matched to the retraction force exerted by the elastomeric laminate. In one configuration, for example, the weight was 250 grams. The elastomeric strands in the laminate sample are oriented in the vertical position, and two marks are then placed on the surface of the sample with a distance of 100 mm separating the marks. Excess material is cut and removed from the sample, and the sample is then clamped into the jaws of a tension measuring device such as a Model DFIS 25 digital force gauge available from the Chatillon Company, a business having offices in Milwaukee, Wis. The marked length of the sample is arranged to span the distance between the jaws, and the jaw separation distance is 90 mm (90 percent of "flat out"). After 30 seconds of time have elapsed, the tension, in grams, is recorded.

The various testing procedures are conducted at ordinary "room conditions" which are known in the art.

Having described the invention in rather full detail, it will be readily apparent that various changes and modifications can be made without the parting from the spirit of the invention. All of such changes and modification are contemplated as being within the scope of the invention as defined by the subjoined claims.

We claim:

1. A process for making an elastomeric web, comprising:
   moving a first web along an appointed machine-direction of said process;
   delivering a plurality of elastomeric strands moving along the machine-direction, said elastomeric strands having been elastomerically stretched to an elongation of at least about 50%, and said plurality of elastomeric strands having been laterally distributed along an appointed cross-direction of said process;
   laminating a second web to said first web with said elastomeric strands sandwiched between said first and second webs to provide an elastomeric laminate, composite web;
   allowing said composite web to elastomerically contract lengthwise;
   winding said composite web into a roll;
   maintaining a position of a movable, web delivery location at a predetermined contraction distance away from an outer, peripheral winding surface produced on said roll; and
   controlling a delivery speed of said composite web at said delivery location.

2. A process as recited in claim 1, further comprising:
   a positioning of said elastomeric strands at a spaced distance from said first web; and
   an applying of an adhesive to said elastomeric strands and to said first web while said elastomeric strands are at said spaced distance from said first web to attach said composite web together with said adhesive.

3. A process as recited in claim 1, wherein said winding of the composite web includes a traverse winding of the composite web; and said moving of said first web provides a first web speed of at least about 5.1 m/sec.

4. A process as recited in claim 3, wherein said moving of said first web and said laminating of said second web are configured to provide at least one web which includes a polymer film web and to provide at least one web which includes a porous, nonwoven fibrous web.

5. A process as recited in claim 4, wherein the process is arranged to provide said polymer film web in an configuration which is substantially liquid impermeable.

6. A process as recited in claim 1, further including a controlling of a circumferential, winding speed at a periphery of said roll to thereby allow said composite web to contract in cooperation with a traverse winding of said web.

7. A process as recited in claim 1, wherein said controlling of said delivery speed of said composite web at said appointed delivery location includes moving said composite web with a delivery roller, said delivery roller driven to rotate at a rate which operatively provides said delivery speed.

8. A process as recited in claim 1, wherein said controlling of said delivery speed of said composite web at said appointed delivery location includes moving said composite web through a delivery nip between a counter-rotating pair of delivery nip rollers, said delivery nip rollers driven to rotate at a rate which operatively provides said delivery speed.

9. A process as recited in claim 8, wherein said maintaining of said delivery location at said predetermined contraction distance includes a moving of said delivery location away from a winding axis of said roll in correspondence with an increase in diameter of said roll produced by said traverse winding.

10. A process as recited in claim 9, wherein said maintaining of said delivery location at said predetermined contraction distance includes a rotating of a support arm about a support pivot axis, said support arm connected to rotationally carry and move said delivery location.

11. A process as recited in claim 9, further comprising a detecting of said diameter of said roll to move said delivery location away from said winding axis in correspondence with said increase in diameter of said roll.

12. A process as recited in claim 11, further comprising a regulating of a rotational, angular speed of said roll in correspondence with said detecting of said diameter of said roll.

13. A process as recited in claim 12, wherein said regulating of said rotational angular speed to provide a substantially constant surface speed at a peripheral surface of said roll.

14. A process as recited in claim 1, further comprising a slitting of said composite web along a machine-direction length of said composite web.

15. A process as recited in claim 1, wherein said applying of said adhesive is configured to apply a multiplicity of meltblown adhesive fibers at an adhesive add-on amount of not more than about 25 g/m².

16. A process as recited in claim 15, wherein said applying of said adhesive is configured to apply said multiplicity of meltblown adhesive fibers at an adhesive add-on amount of at least about 2 g/m².

17. A process as recited in claim 1, wherein said applying of said adhesive is configured to apply a multiplicity of meltblown adhesive fibers at an adhesive add-on amount of not more than about 15 g/m².

18. A process as recited in claim 1, wherein said applying of said adhesive is configured to apply a multiplicity of meltblown adhesive fibers at an adhesive add-on amount of not more than about 10 g/m².

19. A process as recited in claim 1, wherein said applying of said adhesive, said traverse winding of the composite web into the roll, and said allowing of the composite web to elastomerically contract are cooperatively configured to provide said composite web with an elastic stress relaxation value of not more than about 7% loss.

20. A process as recited in claim 19, wherein said applying of said adhesive, said traverse winding of the composite web into the roll, and said allowing of the composite web to elastomerically contract are cooperatively configured to provide said composite web with a cohesion value of at least about 3 kg/in².

21. A process as recited in claim 20, wherein said applying of said adhesive, said traverse winding of the composite web into the roll, and said allowing of the composite web to elastomerically contract are cooperatively configured to provide said composite web with a tension value of at least about 4.3 gm/strand, and not more than about 13 gm/strand of elastomer.

22. A process as recited in claim 1, wherein said winding of the composite web includes a traverse winding of the composite web;

said process further includes a detecting of a diameter of said roll to move said delivery location away from a winding axis in correspondence with said increase in diameter of said roll; and said detecting of said diameter of the roll occurs when a selected, window section of said roll traverses past a sensor.

23. A process as recited in claim 22, wherein said detecting of said diameter occurs when a medial portion of said roll traverses past said sensor.

24. A process as recited in claim 1, further including a controlling of said winding surface speed of said composite web speed at said peripheral surface of said roll to be less than a web speed at said delivery location by a set amount to maintain a set draw between said delivery location and said peripheral surface of the roll.

25. A process as recited in claim 24, further including a maintaining of said set draw throughout a build-up of said roll.

* * * * *